United States Patent [19]

Simon et al.

[11] Patent Number: 5,149,763

[45] Date of Patent: Sep. 22, 1992

[54] PROCESS FOR TRANSFORMING AMINO- OR HYDROXY-CONTAINING MATERIALS OF PLANT SEED ORIGIN INTO PLASTICS FEEDSTOCKS

[75] Inventors: Artur Simon; Éva Z. n. Simon, both of Budapest, Hungary

[73] Assignee: Muanygipari Kutató Intézet, Budapest, Hungary

[21] Appl. No.: 560,585

[22] Filed: Jul. 31, 1990

[30] Foreign Application Priority Data

Jul. 31, 1989 [HU] Hungary ............................ 3907/89

[51] Int. Cl.$^5$ ............................................. C08G 83/00
[52] U.S. Cl. ...................................... 528/1; 528/220; 528/228; 528/230; 528/267
[58] Field of Search ................... 528/1, 220, 228, 230, 528/267; 54/47, 60

[56] References Cited

U.S. PATENT DOCUMENTS

| | | | |
|---|---|---|---|
| 2,408,065 | 9/1946 | Hansen | 525/54.24 |
| 3,725,324 | 4/1973 | Cummisford | 524/47 |
| 3,983,084 | 9/1976 | Alexander et al. | 524/47 |
| 4,085,075 | 4/1978 | Gibbons et al. | 524/47 |

*Primary Examiner*—Samuel A. Acquah
*Attorney, Agent, or Firm*—Keil & Weinkauf

[57] ABSTRACT

The invention relates to a process for transforming amino- or hydroxyl-containing materials of plant seed origin into plastics feedstocks, which comprises (a) reacting amino-containing starting materials of plant seed origin with an oxo compound, optionally also with an amino compound, preferably with urea or melamine, simultaneously or subsequently; or (b) reacting hydroxyl-containing starting materials of plant seed origin with an amino compound in an aqueous medium, and optionally reacting the thus-obtained macromolecule with an oxo compound; or (c) reacting hydroxyl-containing starting materials of plant seed origin with an oxo compound in an aqueous medium, optionally reacting the thus-obtained macromolecule with an amino compound, then transforming the obtained macromolecular material into plastics feedstocks in a known way.

6 Claims, No Drawings

PROCESS FOR TRANSFORMING AMINO- OR HYDROXY-CONTAINING MATERIALS OF PLANT SEED ORIGIN INTO PLASTICS FEEDSTOCKS

This invention relates to a process for transforming amino- or hydroxy-containing materials derived from plant seeds into feedstocks of plastics.

It is known that some plant seeds may contain 9 to 13 per cent, occasionally as much as 20 per cent, of protein. It is also known that the distribution of protein in seeds is not uniform. When seeds are processed, the majority of protein occurs in the flour, somewhat less in the bran. It is obvious that amino groups of proteins can be reacted with suitable chemicals. For instance, gluten in some cereal grains was modified with ethylene oxide or ethylene imide (R. Lásztity: Cereal Proteins (in Hungarian), Publishing House of Agriculture, Budapest, 1981, p. 171). On the other hand, reactions of amino groups of various chemicals and some natural materials are known to be utilized for production of plastics, such as milk casein for manufacturing galalith (Encyclopedia of Polymer Sciences and Technology, Interscience Publisher, New York, 1965, Vol. II, p. 696).

Molecules of starch consist of condensed D-glucose units containing two hydroxyl and one methylol groups each. All of them are reactive, at different degrees, with suitable chemicals such as with those containing amino groups. Reactions causing no degradation of starch are also known. For example, starch forms starch-carbamate with isocyanates or urea at 90° to 110° C., under release of ammonia. In anhydrous medium, formaldehyde reacts with starch monofunctionally or bifunctionally, depending on the reaction conditions, forming acetal or semiacetal, respectively (G. N. H. von Beynum and J. Roels: Starch Conversion Technology, Marcel Dekker Inc., New York, 1985, pp. 480-483; R. L. Whistler and E. F. Paschall: Starch Chemistry and Technology, Academic Press, New York, 1965, p. 311). These products are used in the food industry and as printing paste for textiles as well as in electrolytes of alkaline batteries.

The invention aims at transforming materials of plant seed origin into feedstocks of plastics of outstanding characteristics and differing from those of known polymers in that they decompose rapidly in the soil into harmless materials that cause no pollution in the soil whereas they retain mechanical strength under atmospheric conditions for a longer time.

The invention is based on the recognition that thermoplastic and thermosetting polymer feedstocks can be prepared from materials derived from plant seeds, by reacting them with readily available chemicals. These plastics have substantial mechanical strength and, if desired, decompose rapidly in the soil. This recognition derives from the consideration that, in spite of the relatively low concentration of reactive groups in these plant materials, they are bonded originally to macromolecules; any further linkage acts as cross-linking resulting in giant molecules which form real plastics. It has also been discovered that both mechanical strength and time of decomposition in the soil can be adjusted within a wide range through the proportions of the initial components.

These recognitions are surprising since, even though several products of plant seed origin, such as flour, bran and starch, have been known for a very long time and contemporary science has included a great deal of information about them, no data can still be found about the preparation of plastics or primary materials thereof from the said materials.

Based on the above facts, the invention comprises a process for transforming amino- or hydroxy-containing materials of plant seed origin into plastics feedstocks. This process comprises the steps of (a) reacting amino-containing starting materials of plant seed origin in an aqueous medium with an oxo compound, optionally also with an amino compound, preferably with urea or melamine, simultaneously or subsequently; or (b) reacting hydroxyl-containing starting materials of plant seed origin with an amino compound in an aqueous medium, and optionally reacting the thus-obtained macromolecule with an oxo compound; or (c) reacting hydroxyl-containing starting materials of plant seed origin with an oxo compound in an aqueous medium, and optionally reacting the thus-obtained macromolecule with an amino compound, then transforming the obtained macromolecular material into plastics feedstock in a known way.

The macromolecular reaction product is transformed into plastics feedstock preferably by adding lubricant, stabilizing and colourant additives and by homogenization.

Aldehydes or ketones are preferably used as oxo compounds and urea or melamine are preferably used as amino compounds.

For starting materials derived from plant seeds, flour or bran is preferred in process variant a) while starch is advantageous in process variants b) or c).

In a preferred embodiment of process variant a), 100 g of the material from plant seed origin is reacted with 0.3 to 1 mole of an oxo compound and optionally with 0.4 to 3 moles of an amino compound.

In a preferred embodiment of process variant b) 100 g of the material from plant seed origin are reacted with 0.15 to 1.5 moles of an amino compound and optionally with 0.18 to 3.0 moles of an oxo compound.

In a preferred embodiment of process variant c) 100 g of the material from plant seed origin are reacted with 0.18 to 3.0 moles of an oxo compound and optionally with 0.15 to 1.5 moles of an amino compound.

According to another preferred embodiment of the process of the invention a mixture of hydroxyl-containing and amino-containing materials from plant seed origin is used as starting material.

For obtaining thermosetting resins, the starting material of plant seed origin is reacted with both types of reactants, i.e. both with an oxo compound and with an amino compound.

A great advantage of the process of the invention is that plastics prepared thereby decompose rapidly in the soil, generally speaking, by virtue of microorganisms, into products harmless to the soil and requiring no removal, thus, they can be applied for forced plant cultures, for soil-holding flower-pots, and for other agricultural tools. A further advantage is that the mechanical strength as well as the life-time until the decomposition in the soil can be adjusted in a wide range whereby the particular demands of different cultures can be met all-embracingly. Size and shape of the articles formed from the products of the invention can be selected arbitrarily and thus, optimal space requirement of a plant culture grown therein can be assured. Besides, the process of the invention provides the said advantages in an inexpensive and easy way using cheap materials and economical techniques.

The following examples are presented to illustrate the process of the invention without limiting the scope claimed. Tensile strengths in the Examples were measured by a JJ Lloyd T 5002 tensile test machine. The decomposition in the soil was determined with sheets and cups submerged into the soil under greenhouse conditions.

EXAMPLE 1

250 g of wheat flour were admixed with 260 ml of formol (37 per cent aqueous solution of formaldehyde) (hereinafter the same concentration in each Example) and with 120 g of urea dissolved in 300 ml of water. After adding 100 ml of water, 1 ml of edible oil, 0.1 g of sodium hydrogen carbonate ($NaHCO_3$), and 1 g of sodium stearate, the mixture was stirred for 30 minutes, then evaporated to dryness, finally ground in a hammer mill. The powder was compression moulded at 40 MPa in a mould at 200° C. into a sheet having a tensile strength of 15 $N/mm^2$. Immersed into water, the sheet grew soft in 3 hours. Its life-time until decomposition in the soil amounted to 20 weeks.

EXAMPLE 2

The method of Example 1 was followed but extracted soybean flour was substituted for the wheat flour. Tensile strength of the sheet was 20 $N/mm^2$. Immersed into water, the sheet did not soften even in 240 hours. Its life-time until decomposition in the soil was 9 months.

EXAMPLE 3

To the mixture of 112 g of extracted soybean flour and 112 g of wheat flour, 234 ml of formol, 108 g of urea, 90 ml of water, 0.2 g of $NaHCO_3$, and 1 g of sodium stearate were added. The mixture was stirred for 30 minutes, then evaporated to dryness at 50° C., finally ground in a hammer mill. Tensile strength of the sheet compression moulded from this product was 22 $N/mm^2$. Immersed into water, the sheet swelled by about 10 per cent. Its life-time until decomposition in the soil was 20 months.

EXAMPLE 4

The method of Example 3 was followed but only 117 ml of formol and 54 g of urea were introduced. Tensile strength of the sheet moulded was 16 $N/mm^2$. Thickness of the sheet swelled to its double value in water after 100 hours. Its decomposition time in the soil was 12 months.

EXAMPLE 5

The method of Example 1 was followed but identical amount of bran was substituted for the wheat flour and the mixture was supplemented with 2 g of oxalic acid. Tensile strength of the sheet was 8 $N/mm^2$. Decomposition time in the soil amounted to 7 months.

EXAMPLE 6

The method of Example 3 was followed but urea was omitted. Successful compression moulding of the product could only be performed when the mould was cooled down after moulding. The product was easy to process by injection moulding, transfer moulding, or calandering. The processed end-product was thermoplastic and reprocessable.

EXAMPLE 7

72 g of corn-starch were mixed with 18 ml of formol, then immediately thereafter with 18 ml of saturated aqueous urea solution (57 g/100 ml). 0.01 g of sodium stearate, 0.1 g of $NaHCO_3$ and 23 ml of water were added. The originally fluid mixture thickened in a few seconds, so it needed vigorous stirring immediately. The dense mass was stirred for further 40 minutes, then dried at 50° C., finally ground in a ball mill. The powder was compression moulded at 31 MPa in a mould at 190° C. into a sheet having a tensile strength of 19 $N/mm^2$. Immersed into water, the sheet softened in 24 hours. Its decomposition time in the soil was 8 weeks.

EXAMPLE 8

The method of Example 7 was followed but substituting potato-starch for corn-starch and adding further 25 ml of water. Characteristics of the product were identical to those in Example 6.

EXAMPLE 9

The method of Example 7 was followed but substituting an aqueous solution of 6 g of melamine for the urea. Tensile strength of the compression moulded product was 20 $N/mm^2$. Decomposition time in the soil was 20 weeks.

EXAMPLE 10

80 g of wheat-starch were mixed with 80 ml of saturated aqueous solution of urea, 80 ml of formol, 0.01 g of sodium stearate and 0.1 g of $NaHCO_3$. The mixture solidified in 10 minutes. The solid product was crumbled and air-dried for 3 days while it became rubbery. The material was then dried to hardness at 70° C. for 8 hours and ground into powder in a hammer mill. The powder was compression moulded at 45 MPa in a mould at 200° C. into a sheet having a tensile strength of 27 $N/mm^2$. The sheet did not soften in water after 200 hours. Its decomposition time in the soil was 4 months.

EXAMPLE 11

113 g of corn-starch and 113 g of extracted soybean flour were admixed, then a mixture of 210 of neutralized formol, 87 g of urea and 70 ml of water were added. After supplementing with 0.3 g of sodium stearate, 0.6 g of $NaHCO_3$ and 50 ml of water, the system was stirred for 30 minutes, then dried and ground. Tensile strength of the compression moulded sheet was 18 $N/mm^2$. Decomposition time in the soil was 10 months.

EXAMPLE 12

290 g of corn-starch were mixed with 130 ml of a saturated aqueous solution of urea, 0.04 g of sodium stearate, 0.4 g of $NaHCO_3$, and 125 ml of water. After stirring for 30 minutes the mixture was dried at 50° C. and granulated by extrusion. The thermoplastic pellets were injection moulded into cups that decomposed in the soil in 6 weeks.

EXAMPLE 13

The method of Example 11 was followed but 75 ml of formol were substituted for the urea and water and drying was conducted at 70° C. until unreacted formaldehyde had escaped. The granulated thermoplastic product decomposed in the soil in 3 weeks.

What we claim is:

1. A process for transforming amino-containing materials of plant seed origin into plastics feedstocks, which comprises reacting amino-containing starting materials of plant seed origin with an oxo compound in an aqueous medium of 34% to 62% by mass water, optionally, also with an amino compound, simultaneously or subsequently; then transforming the obtained macromolecular material into plastics feedstock by adding a lubricant, stabilizing additive and, optionally, a colorant additive and homogenizing the mixture.

2. A process as defined in claim 1, wherein the oxo compound is an aldehyde or a ketone.

3. A process as defined in claim 1, wherein the amino compound is urea or melamine.

4. A process as defined in claim 1, wherein the starting material of plant seed origin is flour or bran.

5. A process as defined in claim 1, wherein 100 g of starting material of plant seed origin are reacted with 0.3 to 1 mole of an oxo compound and optionally with 0.4 to 3 moles of an amino compound.

6. A process as defined in claim 1, wherein a mixture of hydroxyl-containing and amino-containing materials of plant seed origin is used as starting material.

* * * * *